(12) United States Patent
Chapman et al.

(10) Patent No.: US 10,215,075 B2
(45) Date of Patent: Feb. 26, 2019

(54) MODULAR MIXER INLET AND MIXER ASSEMBLY TO PROVIDE FOR COMPACT MIXER

(71) Applicant: FAURECIA EMISSIONS CONTROL TECHNOLOGIES, USA, LLC, Columbus, IN (US)

(72) Inventors: Chris Chapman, Columbus, IN (US); Robin Willats, Columbus, IN (US); Yan Wang, Shanghai (CN)

(73) Assignee: FAURECIA EMISSIONS CONTROL TECHNOLOGIES, USA, LLC, Columbus, IN (US)

(*) Notice: Subject to any disclaimer, the term of this patent is extended or adjusted under 35 U.S.C. 154(b) by 400 days.

(21) Appl. No.: 14/834,566

(22) Filed: Aug. 25, 2015

(65) Prior Publication Data

US 2016/0115847 A1   Apr. 28, 2016

Related U.S. Application Data

(60) Provisional application No. 62/068,173, filed on Oct. 24, 2014.

(51) Int. Cl.
| | |
|---|---|
| *F01N 3/00* | (2006.01) |
| *F01N 3/02* | (2006.01) |
| *F01N 3/10* | (2006.01) |
| *F01N 1/00* | (2006.01) |
| *F01N 3/28* | (2006.01) |

(Continued)

(52) U.S. Cl.
CPC ........ *F01N 3/2892* (2013.01); *B01F 3/04049* (2013.01); *B01F 5/0057* (2013.01); *B01F 5/0473* (2013.01); *B01F 5/0647* (2013.01); *F01N 3/2066* (2013.01); *F01N 13/1805* (2013.01); *F01N 2470/18* (2013.01);
(Continued)

(58) Field of Classification Search
CPC ................. F01N 3/2066; F01N 3/2892; F01N 2610/1453; F01N 13/1805; F01N 2470/18; Y02T 10/24
USPC ................... 60/286, 301, 303, 324
See application file for complete search history.

(56) References Cited

U.S. PATENT DOCUMENTS

| | | | |
|---|---|---|---|
| 8,097,055 B2 | 1/2012 | Staley et al. | |
| 8,539,761 B2 * | 9/2013 | Lebas ................. | B01F 3/04049 366/338 |

(Continued)

FOREIGN PATENT DOCUMENTS

| | | |
|---|---|---|
| CN | 203452874 U | 2/2014 |
| DE | 202013006962 U1 | 8/2013 |

(Continued)

*Primary Examiner* — Phutthiwat Wongwian
*Assistant Examiner* — Diem Tran
(74) *Attorney, Agent, or Firm* — Carlson, Gaskey & Olds, P.C.

(57) ABSTRACT

A mixer assembly for a vehicle exhaust system includes a mixer having an upstream end and a downstream end. The mixer defines an internal cavity within which exhaust gases are mixed. A mixer inlet body has an enclosed end and an open end that attaches to the upstream end of the mixer. The mixer inlet body includes an outer peripheral surface extending from the enclosed end to the open end to surround a center axis. The outer peripheral surface includes an inlet port and the enclosed end includes a helically formed portion that initiates a swirling motion to the exhaust gases exiting the inlet port.

22 Claims, 13 Drawing Sheets

(51) Int. Cl.
- *F01N 3/20* (2006.01)
- *B01F 5/00* (2006.01)
- *B01F 5/04* (2006.01)
- *B01F 3/04* (2006.01)
- *B01F 5/06* (2006.01)
- *F01N 13/18* (2010.01)

(52) U.S. Cl.
CPC ... *F01N 2610/1453* (2013.01); *Y02A 50/2325* (2018.01); *Y02T 10/24* (2013.01)

(56) References Cited

U.S. PATENT DOCUMENTS

| | | |
|---|---|---|
| 8,661,792 B2 | 3/2014 | Greber et al. |
| 9,464,546 B2 * | 10/2016 | Perrot .................... F01N 13/02 |
| 2014/0230418 A1 | 8/2014 | Perrot et al. |

FOREIGN PATENT DOCUMENTS

| | | |
|---|---|---|
| EP | 1596044 A1 | 11/2005 |
| FR | 3007068 | 12/2014 |
| WO | 2004113690 A1 | 12/2004 |
| WO | 2011110885 A1 | 9/2011 |
| WO | 2015018849 A1 | 2/2015 |

* cited by examiner

MODULAR MIXER INLET AND MIXER ASSEMBLY TO PROVIDE FOR COMPACT MIXER

RELATED APPLICATION

This application claims priority to U.S. Provisional Application No. 62/068,173, filed Oct. 24, 2014.

BACKGROUND OF THE INVENTION

An exhaust system conducts hot exhaust gases generated by an engine through various exhaust components to reduce emissions and control noise. The exhaust system includes a diesel particulate filter (DPF) that is configured to remove particulate contaminates from exhaust gas flow prior to the exhaust gases entering downstream exhaust system components. In one known configuration, the exhaust system includes an injection system with a doser that injects a reducing agent into the exhaust gases downstream of the DPF and upstream of a selective catalytic reduction (SCR) catalyst. A mixer is positioned upstream of the SCR catalyst and mixes engine exhaust gases and products of urea transformation. The doser is mounted to an outer peripheral surface of the mixer.

In one known configuration, the SCR catalyst and mixer are assembled as a first module having a mixer inlet and a SCR catalyst outlet, and the DPF is assembled as a second module having a DPF inlet and DPF outlet. The first and second modules are connected to each other via the DPF outlet and the mixer inlet. Packaging constraints in different vehicle applications require the first and second modules to be oriented at many different positions relative to each other. The inlet and outlets to the modules have to be re-configured to accommodate these different mounting orientations, which is time consuming and increases manufacturing costs via part proliferation.

Further, it is important that the mixer be able to thoroughly mix the injected fluid with the exhaust gases. As such, the mixer inlet must be configured such that exhaust gases are effectively directed into the mixer in each of the various mounting configurations.

SUMMARY OF THE INVENTION

According to one exemplary embodiment, a mixer assembly for a vehicle exhaust system includes a mixer having an upstream end and a downstream end. The mixer defines an internal cavity that is configured to mix exhaust gases. A mixer inlet body has an enclosed end and an open end that attaches to the upstream end of the mixer. The mixer inlet body includes an outer peripheral surface extending from the enclosed end to the open end to surround a center axis. The outer peripheral surface includes an inlet port and the enclosed end includes a helically formed portion that initiates a swirling motion to the exhaust gases exiting the inlet port.

In another exemplary embodiment, the assembly includes an injection system with a doser that injects a reducing agent into the exhaust gases, and wherein the inlet port is configured to receive exhaust gases from a vehicle engine and wherein the mixer is configured to direct the exhaust gases to a downstream exhaust component, and wherein the reducing agent is injected into the exhaust gases at location that is downstream of the mixer inlet body upstream of the downstream exhaust component.

In another exemplary embodiment, the downstream component comprises a SCR catalyst, and wherein the mixer inlet body, the mixer, and the SCR catalyst are assembled together to form a first module assembly defining a first center axis. A second module assembly defines a second center axis, with the second module assembly comprising at least a DPF and a filter outlet, and wherein the filter outlet is coupled to the mixer inlet body to connect the first and second module assemblies to each other such that the first and second center axes can be orientated in a plurality of different mounting orientations relative to each other.

In another exemplary embodiment, the inlet port is a tangentially orientated inlet port defined by an inlet port axis that does not intersect the center axis.

In another exemplary embodiment, the inlet port is defined by an inlet port axis that intersects the center axis.

In another exemplary embodiment, the assembly includes a perforated plate positioned between an outlet from the mixer inlet body and an inlet into the mixer.

These and other features of the present invention can be best understood from the following specification and drawings, the following of which is a brief description.

DETAILED DESCRIPTION

Figure 1:
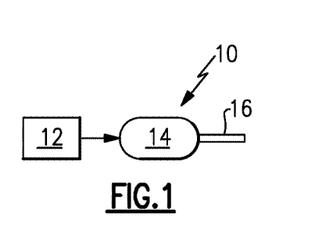
FIG. 1 shows a highly schematic view of a vehicle exhaust system

FIG. 1 shows a schematic representation of a vehicle exhaust system 10 that conducts hot exhaust gases generated by an engine 12 through various exhaust components 14 to reduce emissions and control noise as known. The various exhaust components 14 can include one or more of the following: pipes, filters, valves, catalysts, mufflers etc. The exhaust gas exits the exhaust system 10 via a tailpipe 16.

In one example configuration (FIGS. 2A-2C), the exhaust components 14 include a diesel particulate filter (DPF) 18 that is configured to remove particulate contaminates from exhaust gas flow prior to the exhaust gases entering downstream exhaust system components. In one known configuration, the exhaust system 10 includes an injection system 20 with an injector or doser 22 that injects a reducing agent, such as a solution of urea and water for example, into the exhaust gases downstream of the DPF 18 and upstream of a selective catalytic reduction (SCR) catalyst 24. A mixer 30 is positioned upstream of the SCR catalyst 24 and mixes engine exhaust gases and products of urea transformation. The doser 22 is mounted to an outer peripheral surface 34 of the mixer 30.

In one known configuration, the SCR catalyst 24 and mixer 30 are assembled as a first module 40 having a mixer inlet 42 and a SCR catalyst outlet 44. The DPF 18 is assembled as a second module 50 having a DPF inlet 52 and DPF outlet 54. The first 40 and second 50 modules are connected to each other via the DPF outlet 54 and the mixer inlet 42. The connection can be a direct connection such as that shown in FIGS. 2A and 2B, or dependent upon the packaging constraints, additional tubing or pipe connectors 60 could be used as shown in FIG. 2C.

Further, the connecting elements between the modules 40, 50 are configured such that the first and second center axes A1, A2 can be orientated in a plurality of different mounting orientations relative to each other. To accomplish this, in one example configuration, the subject invention provides the mixer inlet 42, SCR catalyst outlet 44, the DPF inlet 52, and the DPF outlet 54 as a common component. Thus, all four of these components could be formed to be the same component, or any sub-combination of the four components could be formed as the same component. This significantly reduces cost and de-proliferates parts for the modules.

It is important that the mixer 30 be able to thoroughly mix the injected fluid from the doser 22 with the exhaust gases no matter what the orientation is between the first 40 and second 50 modules. The mixer 30 can comprise different mixing configurations; however in the preferred embodiment, the mixer 30 comprises a compact mixer. One example of such a compact mixer is found in application PCT/US2012/057886, filed on Sep. 28, 2013, assigned to the assignees of the present application and hereby incorporated by reference.

As discussed above, the mixer 30 is positioned downstream from the DPF 18 and upstream of the SCR catalyst 24. The mixer 30 is used to generate a swirling or rotary motion of the exhaust gas. The injection system 20 is used to inject a reducing agent, such as a solution of urea and water for example, into the exhaust gas stream upstream from the SCR catalyst 24 such that the mixer 30 can mix the urea and exhaust gas thoroughly together. The injection system 20 (FIG. 2B) includes a fluid supply 28, the doser 22, and a controller 26 that controls injection of the urea as known.

The mixer 30 (FIGS. 3A-3C) comprises a mixer body 30a having an inlet end 30b configured to receive the engine exhaust gases from the mixer inlet 42 and an outlet end 30c to direct a mixture of swirling engine exhaust gas and products transformed from urea to the SCR catalyst 24. The mixer body 30a includes an inlet or upstream baffle 30d and an outlet or downstream baffle 30e that are surrounded by an outer peripheral surface 30f that defines the mixer housing. The upstream baffle 30d is configured to initiate swirling of the exhaust gas flow and includes a large or primary opening 30g that receives the majority of the exhaust gas and which is configured to initiate the swirling motion. The upstream baffle 30d also includes a plurality of perforations or openings 30h that ensure optimal homogenization of exhaust gases and reduces back pressure. The downstream baffle 30e includes a plurality of openings 30i and deflector portions 30j through which the exhaust gas exits. In one example, the downstream baffle includes one primary exit opening that is larger than the other openings.

Figure 3A:
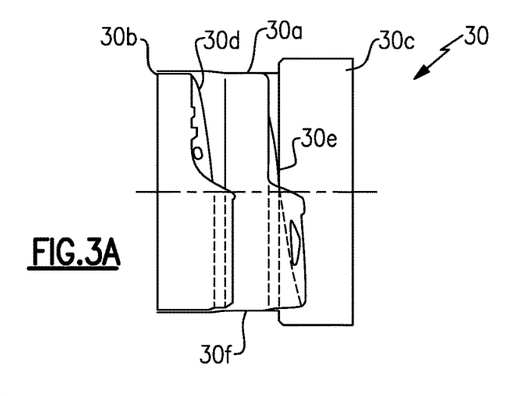
FIG. 3A is a side view of one example of a mixer as used in a module assembly.
Figure 3B:
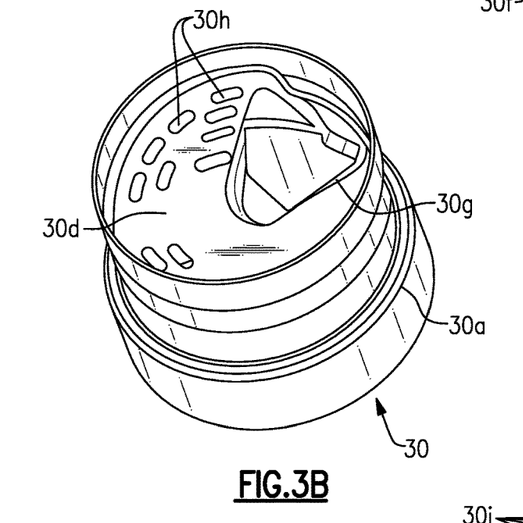
FIG. 3B is a perspective upstream end view of the mixer of FIG. 3A.
Figure 3C:
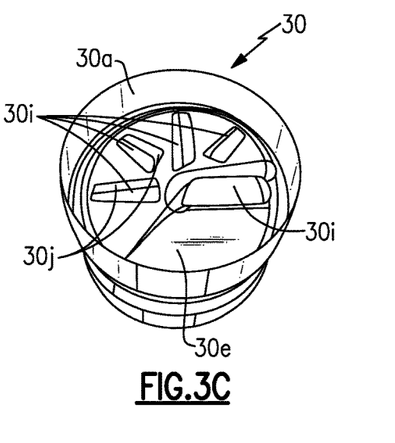
FIG. 3C is a perspective downstream end view of the mixer of FIG. 3A.

The outer peripheral surface 30f of the mixer body 30a includes a doser mount area 62 with an opening to receive the doser 22. The upstream and downstream baffles 30d, 30e are spaced apart from each other in an axial direction along a length of the mixer 30, with the doser mount area 62 being positioned between the two baffles in a very compact configuration.

Figure 2A:
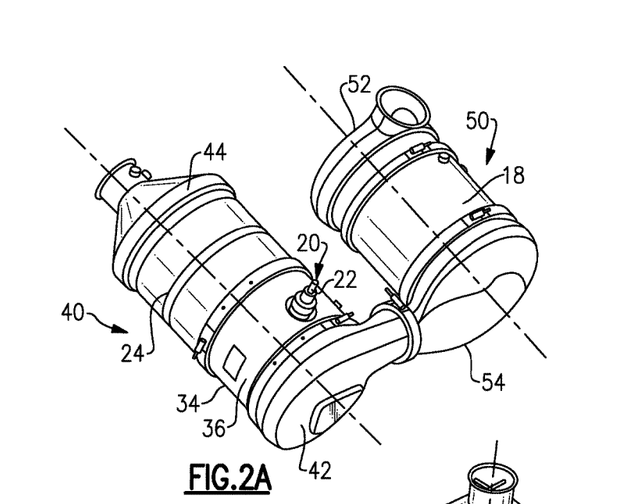
FIG. 2A is one example of a module assembly including a mixer inlet according to the subject invention.
Figure 2B:
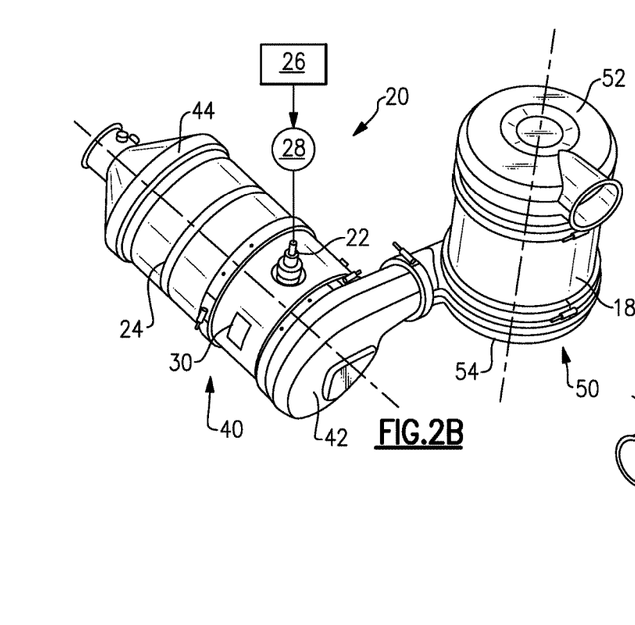
FIG. 2B is another example of a module assembly including a mixer inlet according to the subject invention.
Figure 2C:
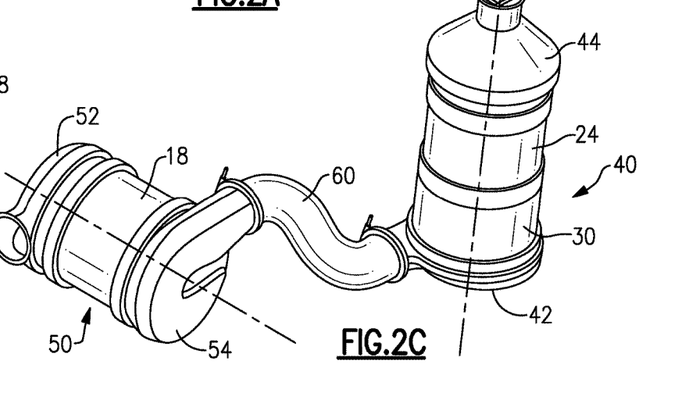
FIG. 2C is another example of a module assembly including a mixer inlet according to the subject invention.

As shown in FIGS. 2A-2C, the first module 40 defines a first center axis A1 extending along a length of the mixer 30 and the SCR catalyst 24. The second module 50 defines a second center axis A2 extending along the DPF 18. The mixer inlet 42 is mounted to the mixer 30 as part of the first module 40 and has an inlet center that is located on the first center axis A1.

In one example, the mixer inlet 42 (FIGS. 4A-4D) comprises an inlet body 42a that has an enclosed end 66 (FIG. 4A) and an opposite open end 68 that attaches to the upstream open end of the mixer 30. In one example, the inlet body 42 comprises a circular shape. The inlet body 42a has an outer peripheral surface 42b that extends between the open 68 and enclosed 66 ends. The outer peripheral surface 42b surrounds the first center axis A1 to define an internal cavity. In one example, a tangential exhaust gas inlet port for the mixer inlet 42 is formed as part of the outer peripheral surface 42b. The tangential exhaust gas inlet port comprises a tubular portion 42c with an opening defining an inlet axis 42d that is in a tangential relationship to an imaginary circle (defined by a radius that extends from the first center axis to intersect the axis 42d) that surrounds the first center axis A1. In one example, the tubular portion 42c has a circular cross-section at the inlet.

Figure 4A:
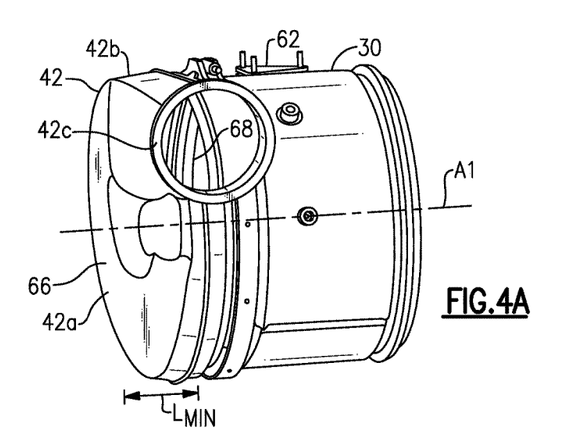
FIG. 4A is one example of a mixer assembly including a mixer and a mixer inlet according to the subject invention.
Figure 4B:
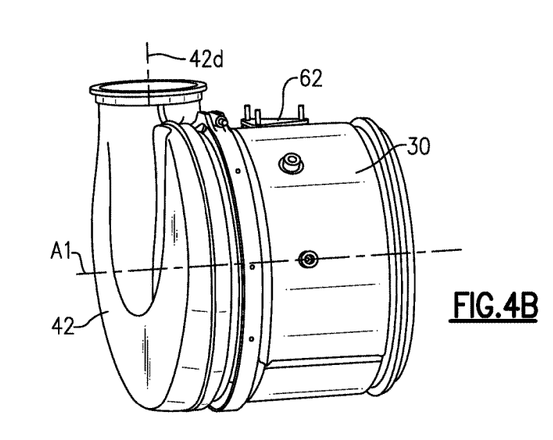
FIG. 4B is another example of a mixer assembly including a mixer and a mixer inlet according to the subject invention.

The tangentially orientated inlet port at the tubular portion 42c is configured to receive exhaust gases from the vehicle engine 12 and initiate a swirling motion to the exhaust gases. In order to initiate the swirling motion, the closed end face 66 comprises a helical shape as best shown in FIGS. 4A-4B.

Figure 4C:
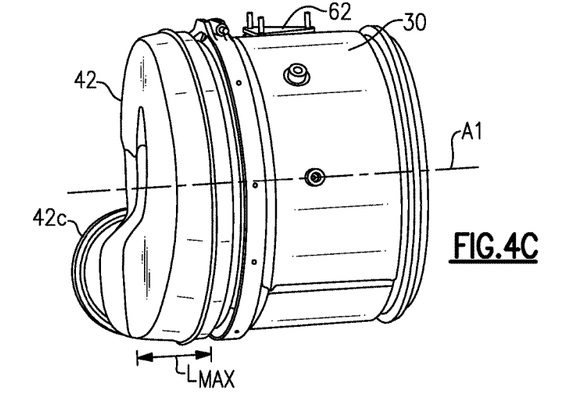
FIG. 4C is another example of a mixer assembly including a mixer and a mixer inlet according to the subject invention.

The outer peripheral surface 30f defines an axial length L from the enclosed end 66 to the open end 68. Due to the helical shape, this axial length L varies about a periphery of the mixer inlet body 42a as best shown in FIG. 4C. The axial length $L_{MAX}$ is at a maximum at one side of the inlet port 42c. The axial length $L_{MIN}$ is at a minimum at an opposite side of the inlet port 42c, with the length gradually decreasing from the maximum length to the minimum length as the peripheral surface of the mixer inlet 42 extends just under three hundred and sixty degrees about the center axis A1. This gradual decrease in length forms the helical shape.

In one example, the mixer inlet 42 is formed from stamped sheet metal such that the helical shape is formed in the external and internal surfaces of the enclosed end 66. In another example, the mixer inlet 42 comprises a cast component with an inner surface of the enclosed end 66 including a cast-in contoured helical shape. These are just two examples of how the mixer inlet 42 can be formed to include the helical shape. Other materials and manufacturing methods could also be used.

Figure 4D:
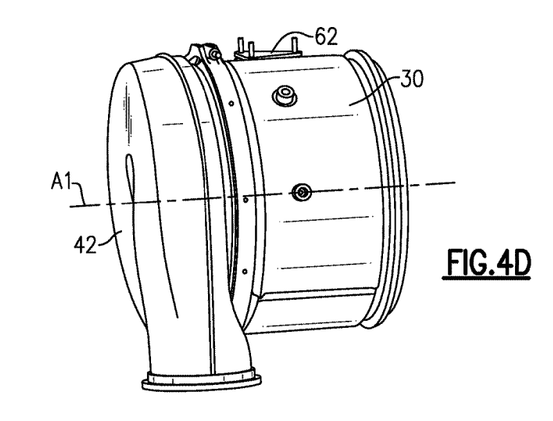
FIG. 4D is another example of a mixer assembly including a mixer and a mixer inlet according to the subject invention.

As discussed above, the mixer 30 includes an injector mount area 62 for the doser 22. The inlet port 42 can be selectively rotated between a plurality of different positions (FIGS. 4A-4D) relative to the injector mount area 62 to achieve a desired mounting orientation relative to the injector 22 prior to permanently attaching the mixer inlet body 42a to the mixer 30. For example, FIG. 4A shows a configuration where the inlet port 42c is rotated ninety degrees relative to the injector mount area 62, FIG. 4B shows a configuration where the inlet port 42c is rotated zero degrees relative to the injector mount area 62, FIG. 4C shows a configuration where the inlet port 42c is rotated two hundred and seventy degrees relative to the injector mount area 62, and FIG. 4D shows a configuration where the inlet port 42c is rotated one hundred and eighty degrees relative to the injector mount area 62. Thus, the mixer inlet 42 and compact mixer 30 are joined in such a way as to allow a varying position to allow multiple configurations of the assembly for packaging requirements.

As discussed above, the tangential inlet compact mixer 30 uses a modular design which allows duplication of the mixer inlet 42 to be used as both the inlet and outlet of a connection between first 40 and second 50 modules. Both the DPF outlet 54 and mixer inlet 42 are attached upstream-to-downstream by a joint which allows a varying position depending upon the vehicle application's packaging requirement as shown in the examples of FIGS. 2A-2C. The varying positions do not affect mixing performance as the mixing is done in the mixer inlet 42 and in the compact mixer 30.

Figure 5:
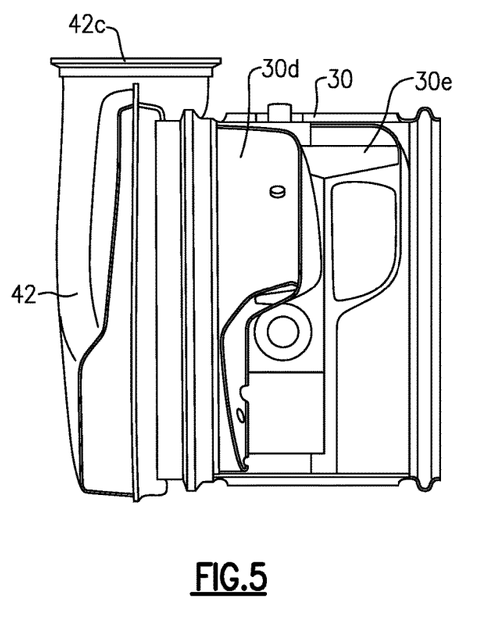
FIG. 5 is a side view in partial cross-section of the mixer assembly of FIG. 4B.

The inlet baffle 30d of the mixer includes a helical shape (FIGS. 3B and 5) that faces the helical shape of the mixer inlet 42. Thus, the helical shape of the mixer inlet 42 forms a continuation of the helical shape of the mixer 30 which allows flow to enter the tangential inlet in a spiral flow and continue in a spiral orientation into the mixer 30. As discussed above, the inlet port 42c is positioned tangentially with respect to the mixer inlet body such that the axis 42d defined by the inlet port 42 does not intersect the first center axis A1.

Figure 6:
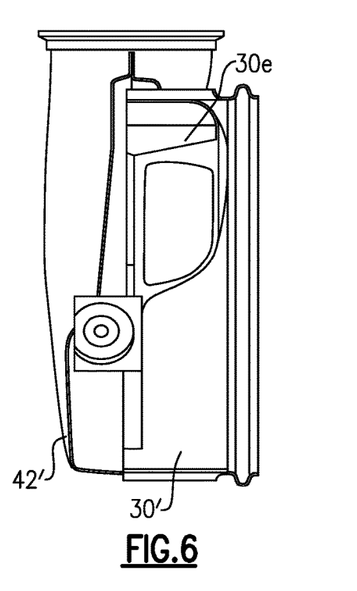
FIG. 6 is a side view in partial cross-section of another example of a mixer assembly that has an upstream inlet baffle removed for a more compact configuration.
Figure 7:
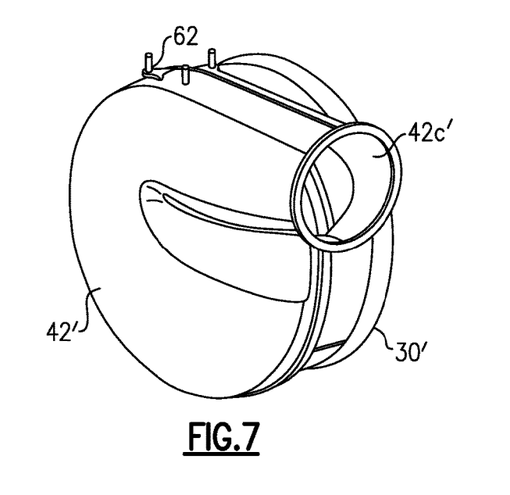
FIG. 7 is a perspective end view of the mixer assembly of FIG. 6.
Figure 8:
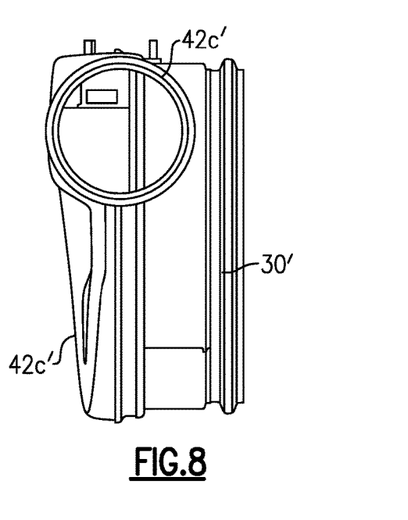
FIG. 8 is side view of the mixer assembly of FIG. 7.

In another embodiment (FIGS. 6-10C), an assembly includes a mixer inlet 42', a compact mixer 30', and an outlet or downstream baffle 30e' (FIG. 10B) with the mixer inlet or upstream baffle 30d described above being removed. The mixer inlet 42' and the mixer 30' can be attached to each other or integrally formed as one piece. The helical shape of the mixer inlet 42' replaces the function of the helically-shaped inlet baffle of the mixer to provide an even more compact configuration. The mixer outlet baffle 30e' is substantially similar to the outlet baffle 30e described above. The compact mixer 30' configuration has a significantly shorter overall length as compared to the mixer 30 configuration that includes both an upstream and downstream baffle, e.g. compare FIG. 6 with FIG. 5. This more compact configuration significantly increases available packaging options.

Figure 9A:
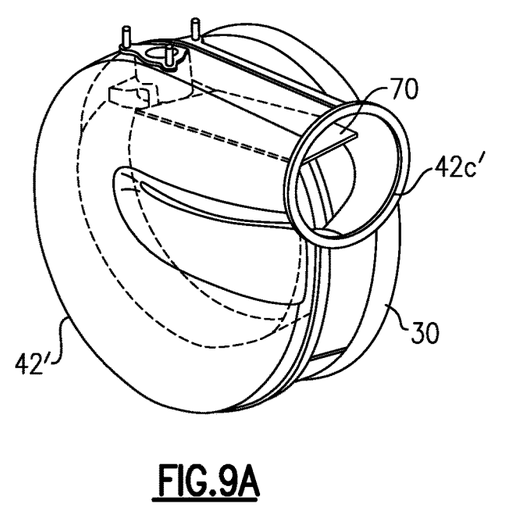
FIG. 9A is a view similar to FIG. 7 but showing an internal wall member within the mixer assembly.
Figure 9B:
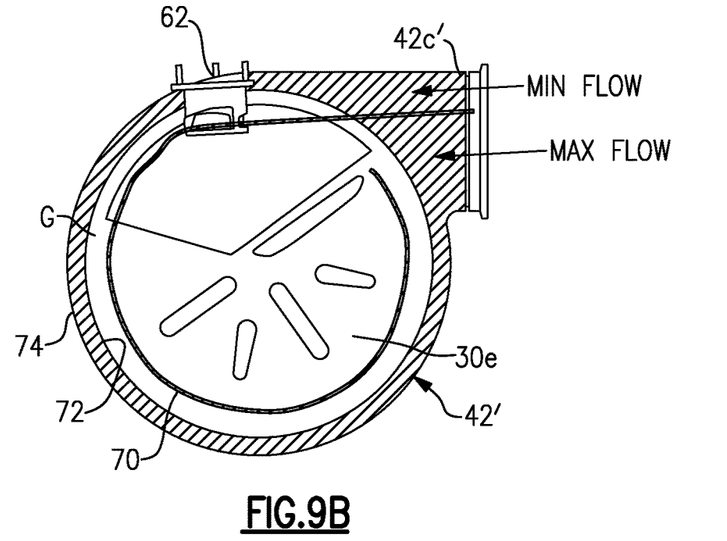
FIG. 9B is a cross-sectional end view of the mixer of FIG. 9A.
Figure 10A:
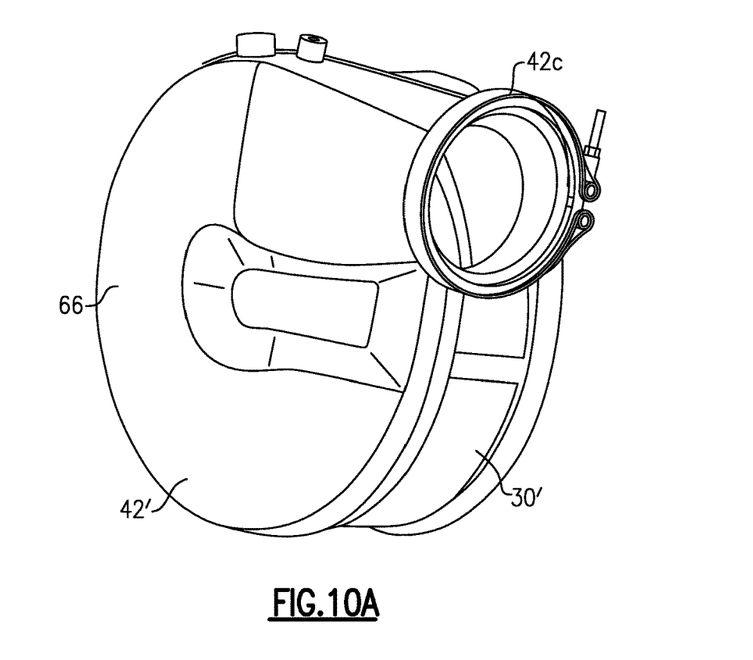
FIG. 10A is an upstream enclosed end view of another mixer assembly similar to FIG. 6.
Figure 10B:
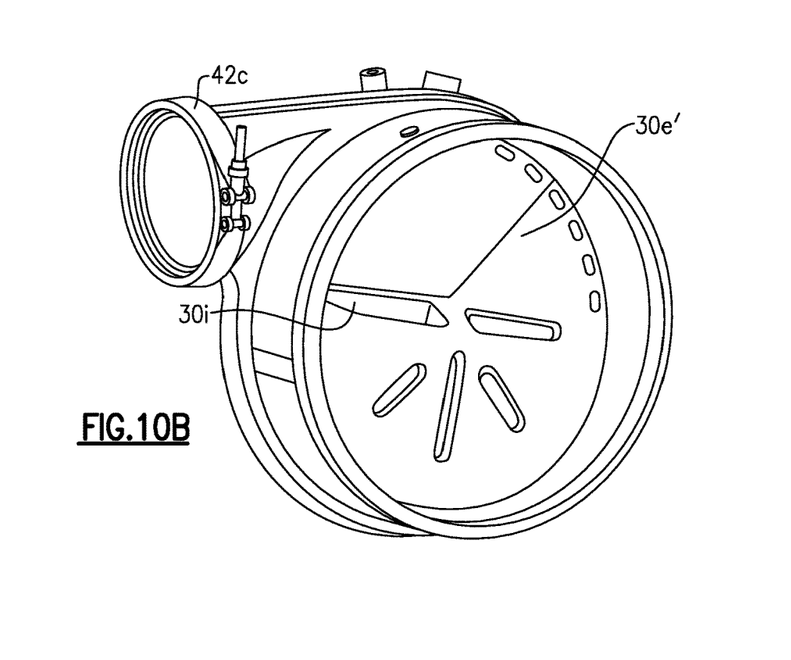
FIG. 10B is a downstream open end view of the mixer assembly of FIG. 10A.
Figure 10C:
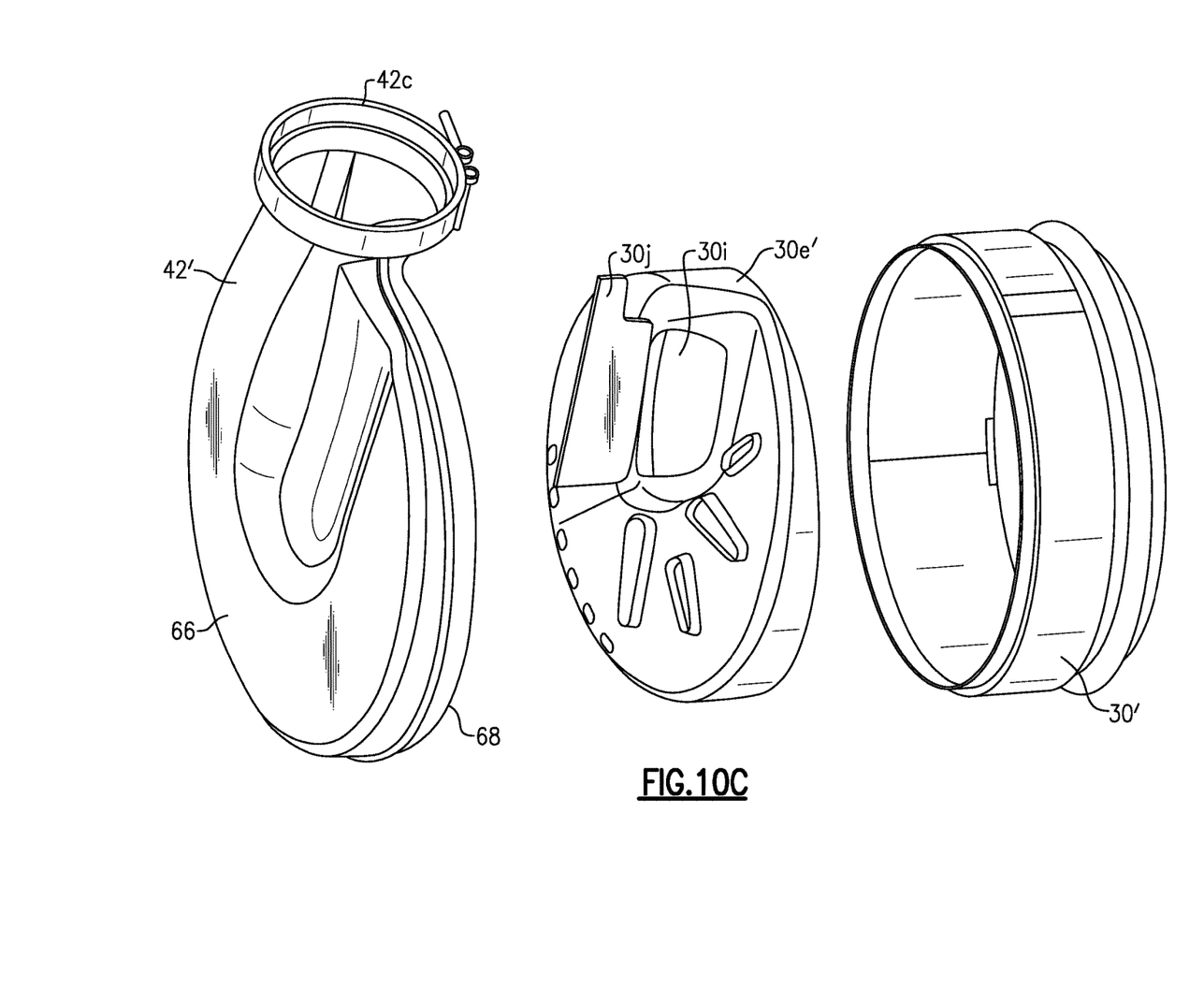
FIG. 10C is an exploded view of the mixer assembly of FIG. 10A.

As shown in FIGS. 9A-9B, this configuration includes an inner wall 70 that is spaced from an inner surface 72 of a mixer inlet housing 74 by a gap G. In one example, approximately ten percent of the exhaust gas flows into this gap G while the remaining exhaust gas swirls into a center of the mixer 30'. The inner wall 70 can be extended upstream into the inlet opening of the tangential inlet port 42c' to further promote the splitting of exhaust gas flow.

Figure 11:
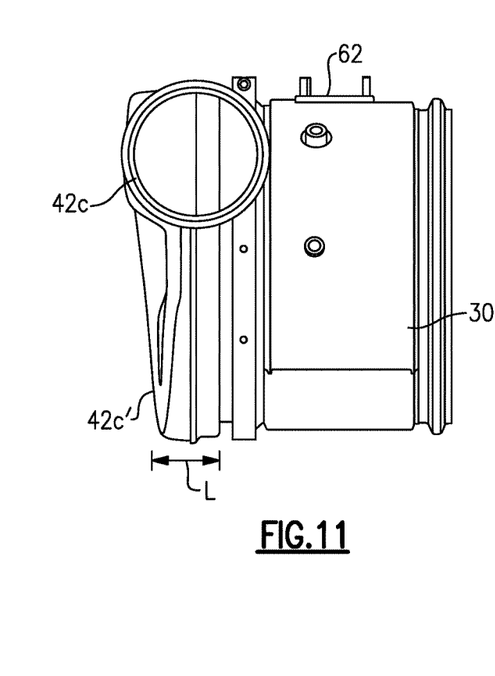
FIG. 11 is a side view showing one example of an inlet port configuration.
Figure 12:
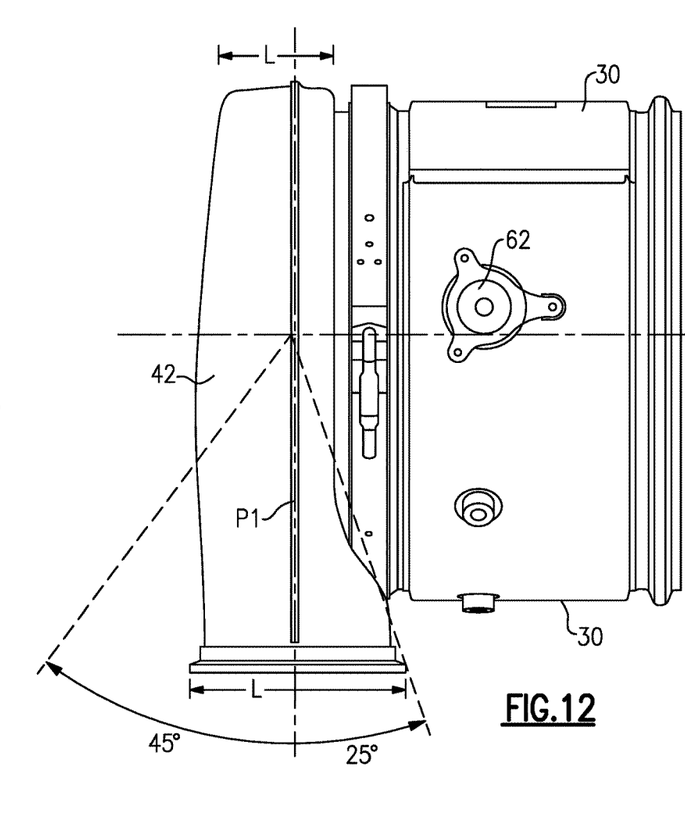
FIG. 12 is a top view of the configuration of FIG. 11 showing an angular range of the inlet position.

FIGS. 11-12 disclose the angular range of the inlet position. The angles of the inlet position are defined in relation to a plane P1 which is along the inlet axis 42d and is perpendicular to a centerline for the compact mixer 30 and/or the SCR catalyst 24, which is downstream of the mixer 30. This angular range is important because there are vehicle packaging space constraints where in an "end view" looking along the catalyst center line, the inlet is tangential (as shown in the previous drawings) but in a side view (looking parallel to the catalyst center line) the inlet angle is not perpendicular to the catalyst center line. An example range is shown in FIG. 12.

Figure 13A:
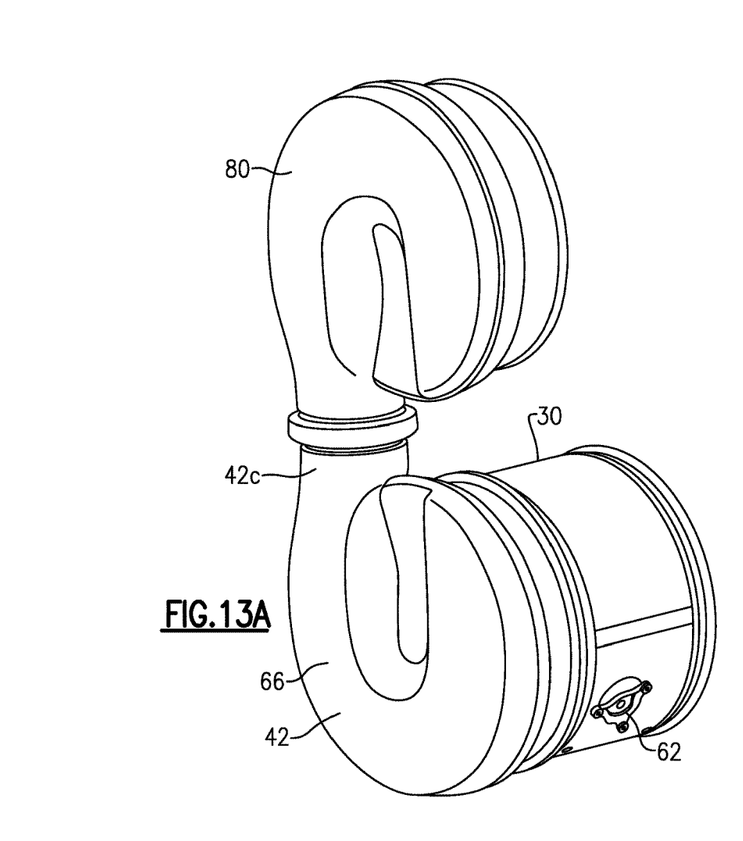
FIG. 13A is an upstream end view of a mixer assembly connected to an adjacent module.
Figure 13B:
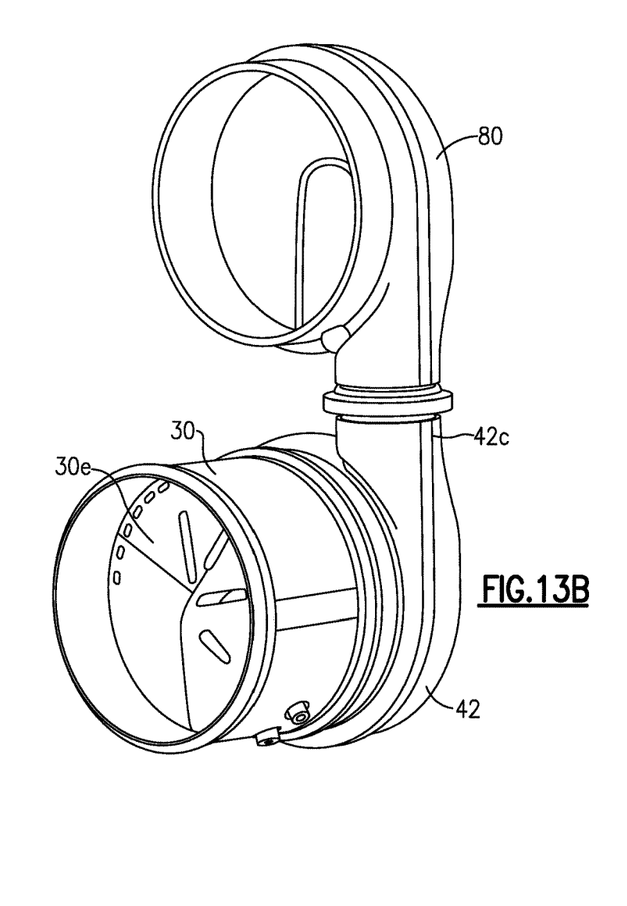
FIG. 13B is a downstream end view of the mixer assembly of FIG. 13A.

FIGS. 13A-13B show a configuration with the mixer inlet 42 attached to the mixer 30 and with the mixer inlet 42 attached to an outlet structure 80 that is to be connected to another module. In the example shown, the mixer inlet 42 and outlet structure 80 are mirror images of each other. FIG. 13A shows an upstream view of the enclosed end 66 and FIG. 13B shows a downstream view. The mixture of exhaust gas and injected fluid exits the outlet baffle 30e and is directed to the downstream component.

Figure 14A:
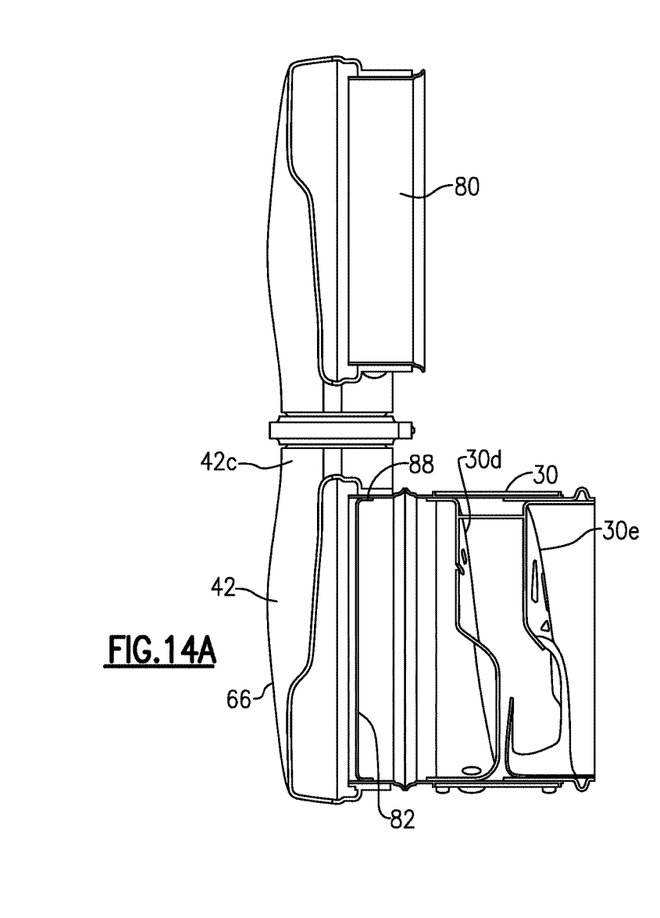
FIG. 14A is a side cross-sectional view of a module assembly with a perforated plate.
Figure 14B:
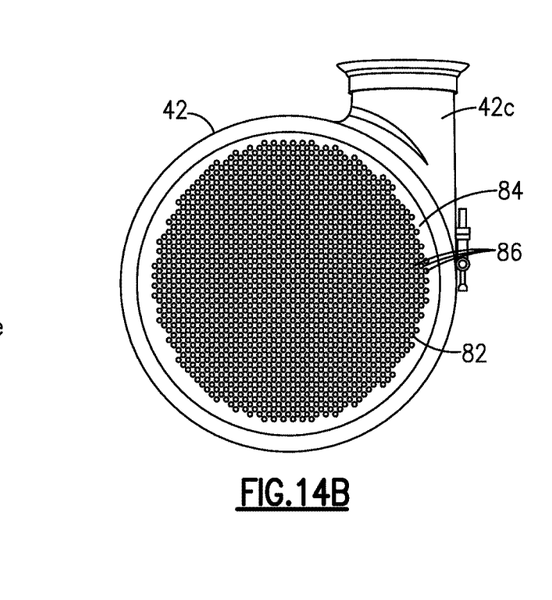
FIG. 14B is an end view of the perforated plate of FIG. 14A.

FIGS. 14A-14B are similar to FIGS. 13A-13B but include a perforated plate 82. The perforated plate 82 is positioned between the mixer inlet 42 and the mixer 30. The perforated plate 82 comprises a substantially flat plate body 84 with a plurality of openings 86. The perforated plate 82 extends across the entire exhaust gas passage within the mixer 30 such that all exhaust gas exiting the mixer inlet 42 must pass through the perforated plate 82 before entering the mixer 30. This further facilitates mixing and provides for a more evenly distributed mixture across the exhaust gas path. A transversely extending flange 88 surrounds the outer periphery of the perforated plate 82 and engages an inner peripheral surface of the mixer 30 or mixer inlet 42 such that the perforated plate 82 can be fixed in place by welding or brazing, for example.

Figure 15A:
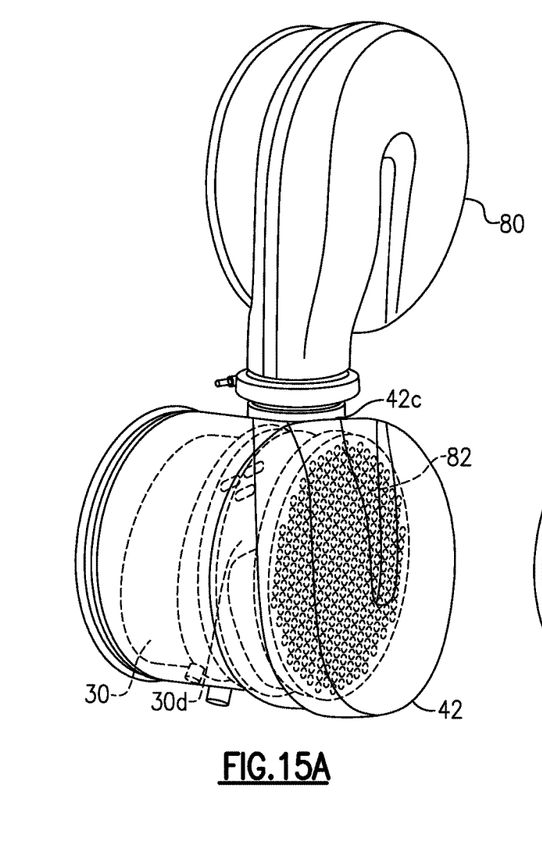
FIG. 15A is a perspective view showing a perforated plate configuration as installed.
Figure 15B:
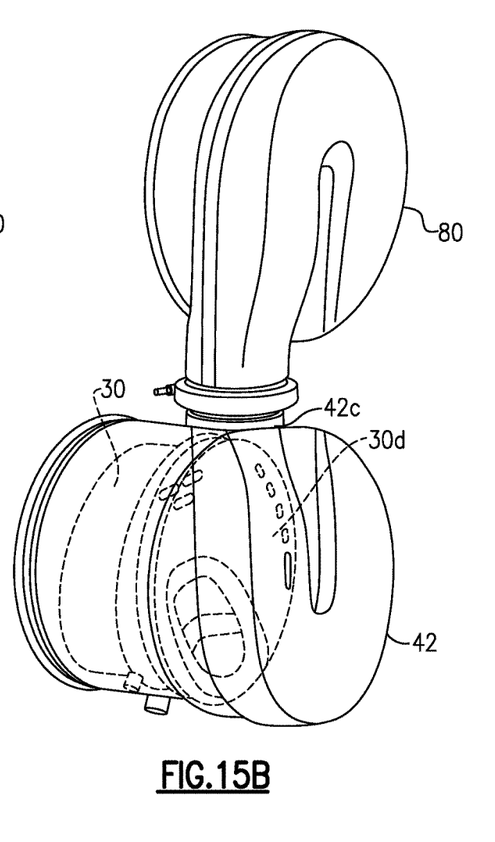
FIG. 15B is a perspective view of the configuration of FIG. 15A without the perforated plate.

FIG. 15A shows an assembled configuration with the perforated plate 82 installed and FIG. 15B shows a configuration without the perforated plate. In the FIG. 15A configuration, exhaust gases exiting the mixer inlet 42 flow through the plate 82 and then encounter the upstream baffle 30d. In the FIG. 15B configuration, exhaust gases exit the mixer inlet 42 and are immediately directed toward the upstream baffle 30d of the mixer 30.

Figure 16A:
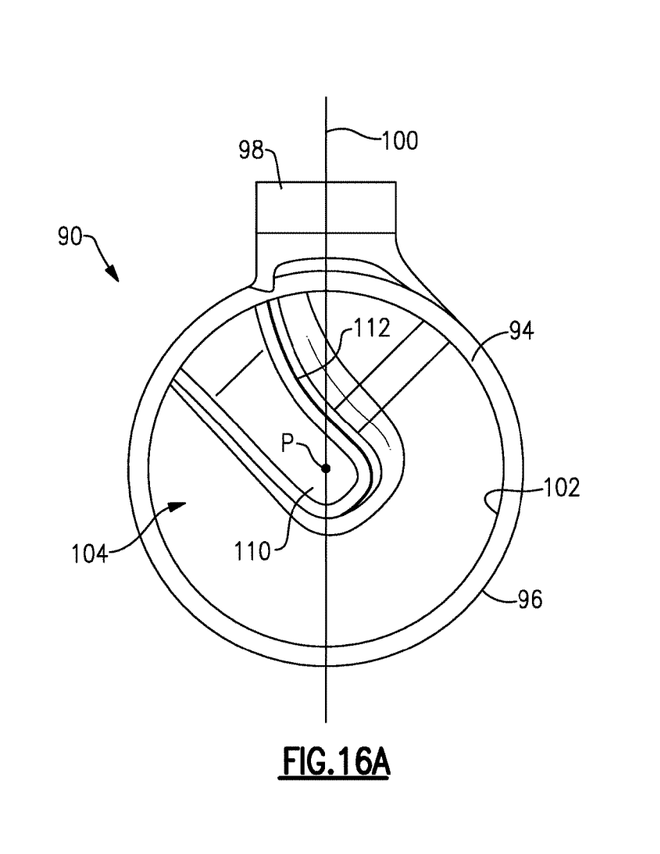
FIG. 16A is a downstream end view of a center-in mixer inlet.
Figure 16B:
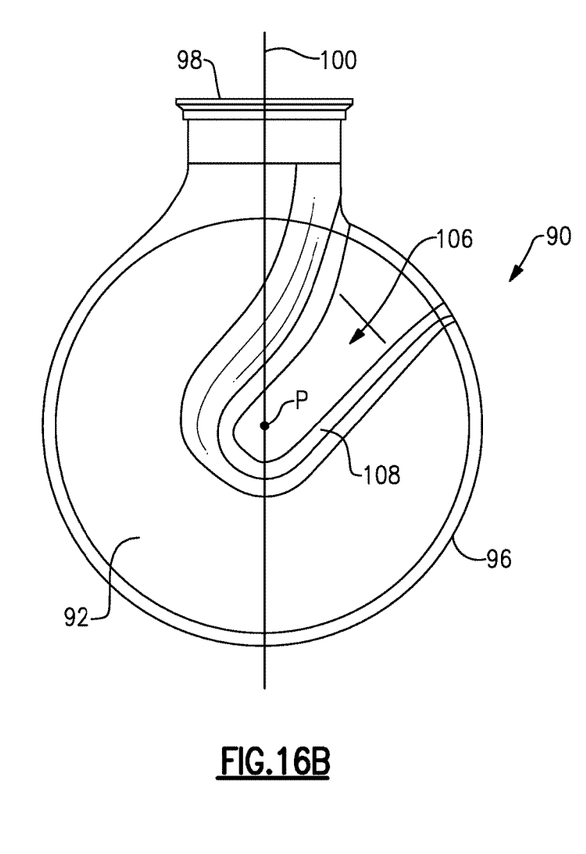
FIG. 16B is an upstream end view of the mixer inlet of FIG. 16A.
Figure 16C:
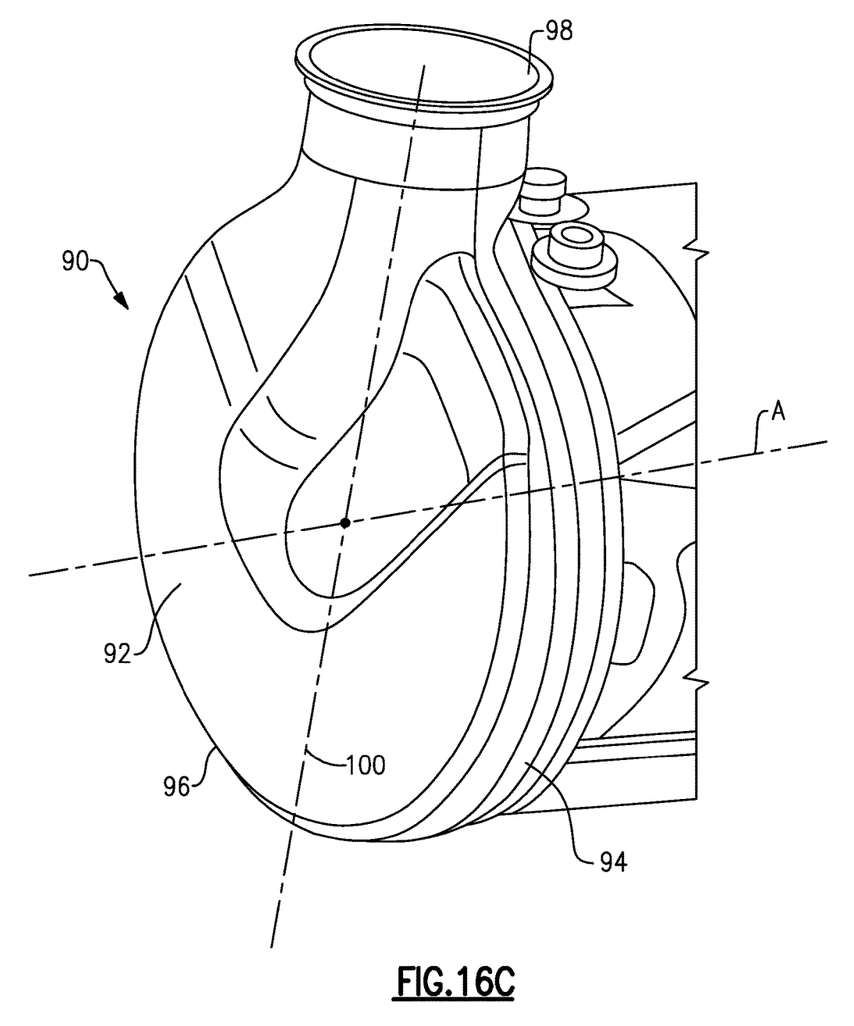
FIG. 16C is perspective view of the mixer inlet of FIG. 16A.

FIGS. 16A-16C show a center-in configuration for a mixer inlet 90. In this configuration, the mixer inlet 90 includes an upstream enclosed end 92, a downstream open end 94 and an outer peripheral surface 96 that surrounds a center axis A (FIG. 16C). An inlet port 98 is formed in the outer peripheral surface 96 and defines an inlet port axis 100 that intersects the center axis A. The center-in configuration provides for an easier and more effective installation for certain packaging arrangements.

An inner peripheral surface 102 defines an internal cavity 104 for the mixer inlet 90. The enclosed end 92 includes an indented feature 106 that extends into the internal cavity 104 to form the helical shape in the mixer inlet 90. Thus, a recess 108 (FIG. 16B) is formed externally on the mixer inlet 90 and a protrusion 110 (FIG. 16A) is formed internally of the mixer inlet 90. The protrusion 110 extends radially inwardly from the outer peripheral edge and extends to overlap and pass the center axis point P of the mixer inlet 90. The protrusion 110 includes a curved surface portion 112 that faces the inlet port 98 to direct exhaust gases toward the inner peripheral surface 102 instead of toward the center axis point P. As such, exhaust gas entering the inlet port 98 is blocked from being directed to a center of the mixer inlet 90 by the protrusion 110 and instead is initiated into a swirling motion along the helical path.

In one example, the protrusion can be formed by stamping. In another example, the protrusion can be cast into the mixer inlet. In either configuration, the indentation feature provides the helically formed portion that makes sure the exhaust gas flow is swirled within the mixer inlet, and which also increases mixing length resulting in improved mixing performance.

The preceding description is exemplary rather than limiting in nature. Variations and modifications to the disclosed examples may become apparent to those skilled in the art that do not necessarily depart from the essence of this disclosure. The scope of legal protection given to this disclosure can only be determined by studying the following claims.

Although a combination of features is shown in the illustrated examples, not all of them need to be combined to realize the benefits of various embodiments of this disclosure. In other words, a system designed according to an embodiment of this disclosure will not necessarily include all of the features shown in any one of the Figures or all of the portions schematically shown in the Figures. Moreover, selected features of one example embodiment may be combined with selected features of other example embodiments.

The invention claimed is:

1. A mixer assembly for a vehicle exhaust system comprising:
   a mixer having an upstream end and a downstream end, the mixer defining an internal cavity configured to mix exhaust gases, and wherein the mixer includes an injector mount area for a doser that injects a reducing agent into the exhaust gases;
   a mixer inlet body having an enclosed end and an open end that attaches to the upstream end of the mixer, the mixer inlet body including an outer peripheral surface extending from the enclosed end to the open end to surround a center axis, wherein the outer peripheral surface includes an inlet port comprising a tubular portion, and wherein the enclosed end includes a helically formed portion that initiates a swirling motion to the exhaust gases exiting the inlet port;
   wherein the inlet port is configured to receive exhaust gases from a vehicle engine and wherein the mixer is configured to direct the exhaust gases to a downstream exhaust component, and wherein the reducing agent is injected into the exhaust gases at location that is downstream of the mixer inlet body and upstream of the downstream exhaust component; and
   wherein the inlet port is selectively rotated between a plurality of different positions relative to the injector mount area to achieve a desired mounting orientation relative to the injector mount area prior to attaching the mixer inlet body to the mixer.

2. The mixer assembly according to claim 1 wherein the downstream component comprises a catalyst, and wherein the mixer inlet body, the mixer, and the catalyst are assembled together to form a first module assembly defining a first center axis.

3. The mixer assembly according to claim 2 including a second module assembly defining a second center axis, the second module assembly comprised of at least a particulate filter and a filter outlet, and wherein the filter outlet is coupled to the mixer inlet body to connect the first and second module assemblies to each other such that the first and second center axes can be orientated in a plurality of different mounting orientations relative to each other.

4. The mixer assembly according to claim 3 wherein the mixer inlet body comprises a mixer inlet, and wherein the mixer inlet and the filter outlet are two components that are the same.

5. The mixer assembly according to claim 1 wherein the inlet port is positionable within a range of angles of an inlet position which are defined in relation to a plane that is perpendicular to a centerline for the mixer.

6. The mixer assembly according to claim 1 wherein the inlet port is defined by an inlet port axis that intersects the center axis.

7. The mixer assembly according to claim 6 wherein the enclosed end includes an indentation that extends from an outer periphery to overlap a center portion of the enclosed end, the indentation providing the helically formed portion that directs exhaust gases along a spiral path that does not intersect the center axis.

8. The mixer assembly according to claim 1 wherein the mixer has an outlet configured to direct the exhaust gases to a downstream exhaust component, and wherein the mixer inlet body, the mixer, and the downstream exhaust component comprise a first module assembly defining a first center axis, and including a second module assembly defining a second center axis that is separate from the first center axis, wherein the second module assembly includes at least an upstream exhaust component, an inlet connected to an inlet end of the upstream exhaust component and an outlet connected to an outlet end of the upstream exhaust component, wherein the mixer inlet body comprises a mixer inlet, and wherein at least one of the inlet and outlet and the mixer inlet are two components that are the same.

9. The mixer assembly according to claim 8 wherein the first center axis is spaced apart from, and parallel to the second center axis, or wherein the first center axis is spaced apart from and non-parallel to the second center axis.

10. The mixer assembly according to claim 8, wherein the inlet, the outlet, and the mixer inlet are three components that are the same.

11. A mixer assembly for a vehicle exhaust system comprising:
- a mixer having an upstream end and a downstream end, the mixer defining an internal cavity configured to mix exhaust gases, and wherein the mixer includes an injector mount area for a doser that injects a reducing agent into the exhaust gases; and
- a mixer inlet body having an enclosed end and an open end that attaches to the upstream end of the mixer, the mixer inlet body including an outer peripheral surface extending from the enclosed end to the open end to surround a center axis, wherein the outer peripheral surface includes an inlet port comprising a tubular portion, and wherein the enclosed end includes a helically formed portion that initiates a swirling motion to the exhaust gases exiting the inlet port, and wherein the inlet port is a tangentially orientated inlet port defined by an inlet port axis that does not intersect the center axis.

12. The mixer assembly according to claim 11 wherein the outer peripheral surface defines an axial length from the enclosed end to the open end, and wherein the axial length varies about a periphery of the mixer inlet body.

13. The mixer assembly according to claim 12 wherein the axial length is a maximum length at one side of the inlet port, is a minimum length at an opposite side of the inlet port, and gradually decreases therebetween to form the helical shape.

14. The mixer assembly according to claim 11 wherein the mixer inlet body comprises a circular shape and wherein the tubular portion comprises a circular inlet tube at the inlet port.

15. The mixer assembly according to claim 11 wherein the mixer includes at least one baffle positioned within the internal cavity, the at least one baffle including a primary opening and plurality of secondary openings each defined by a cross-sectional area that is less than a cross-sectional area of the primary opening.

16. The mixer assembly according to claim 15 wherein the at least one baffle comprises at least an inlet baffle and an outlet baffle downstream of the inlet baffle, and including a mixer housing surrounding the inlet and outlet baffles, and wherein each of the inlet and outlet baffles includes a primary opening and plurality of secondary openings each defined by a cross-sectional area that is less than a cross-sectional area of the primary opening.

17. The mixer assembly according to claim 16 wherein the inlet baffle comprises a helical shape and wherein the helically formed portion of the mixer inlet body faces the helical shape of the inlet baffle such that a continuous and uninterrupted helical shape is formed along a length of the mixer inlet body and the mixer which allows flow to enter the inlet port and spiral through the helically formed portion in a spiral flow and continue in a spiral orientation into the helical shape of the inlet baffle of the mixer.

18. The mixer assembly according to claim 11 wherein the mixer includes only one baffle positioned in the internal cavity, the baffle being positioned adjacent the downstream end of the mixer, and wherein the baffle includes a primary opening and plurality of secondary openings each defined by a cross-sectional area that is less than a cross-sectional area of the primary opening, and wherein exhaust gases exit the mixer inlet body in a swirling motion and are directed to a downstream component via the primary and secondary openings.

19. A mixer assembly for a vehicle exhaust system comprising:
- a mixer having an upstream end and a downstream end, the mixer defining an internal cavity configured to mix exhaust gases; and
- a mixer inlet body having an enclosed end and an open end that attaches to the upstream end of the mixer, the mixer inlet body including an outer peripheral surface extending from the enclosed end to the open end to surround a center axis, wherein the outer peripheral surface includes an inlet port that is a tangentially orientated inlet port defined by an inlet port axis that does not intersect the center axis, and wherein the enclosed end includes a helically formed portion that initiates a swirling motion to the exhaust gases exiting the inlet port;
- an inner wall member that is spaced inwardly from an inner surface of the mixer inlet body by a gap to define a first spiral flow path between the inner surface of the mixer and an outer surface of the inner wall member into which a first percentage of the exhaust gas is directed and a second spiral flow path along an inner surface of the inner wall member into which a second percentage of the exhaust gas is directed, the second percentage being greater than the first percentage; and
- wherein the mixer includes only one baffle positioned in the internal cavity, the baffle being positioned adjacent the downstream end of the mixer, and wherein the baffle includes a primary opening and plurality of secondary openings each defined by a cross-sectional area that is less than a cross-sectional area of the primary opening, and wherein exhaust gases exit the mixer inlet body in a swirling motion and are directed to a downstream component via the primary and secondary openings.

20. The mixer assembly according to claim 19 wherein the inner wall member extends upstream into an inlet opening of the inlet port.

21. A mixer assembly for a vehicle exhaust system comprising:
- a mixer having an upstream end and a downstream end, the mixer defining an internal cavity configured to mix exhaust gases, and wherein the mixer includes an injector mount area for a doser that injects a reducing agent into the exhaust gases;
- a mixer inlet body having an enclosed end and an open end that attaches to the upstream end of the mixer, the mixer inlet body including an outer peripheral surface extending from the enclosed end to the open end to surround a center axis, wherein the outer peripheral surface includes an inlet port comprising a tubular portion, and wherein the enclosed end includes a helically formed portion that initiates a swirling motion to the exhaust gases exiting the inlet port; and
- a perforated plate positioned between an outlet from the mixer inlet body and an inlet into the mixer.

22. The mixer assembly according to claim 21 wherein the perforated plate extends across an entire cross-section of an exhaust gas flow path defined within the mixer inlet body and the mixer, such that all exhaust gas exiting the mixer inlet body must pass through the perforated plate before entering the mixer.

* * * * *